April 6, 1965  W. H. SCHNACKE  3,176,547
VARIABLE SPEED TRANSMISSION FOR A PORTABLE DRILL
Filed Feb. 13, 1961  3 Sheets-Sheet 1
FIG. 1
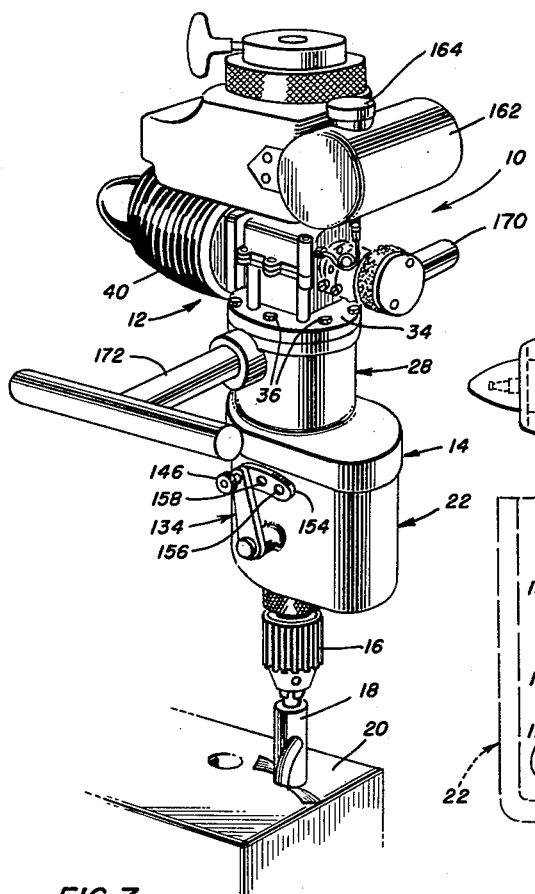
FIG. 9
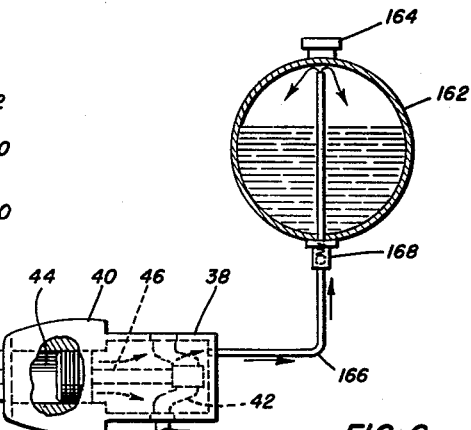
FIG. 6
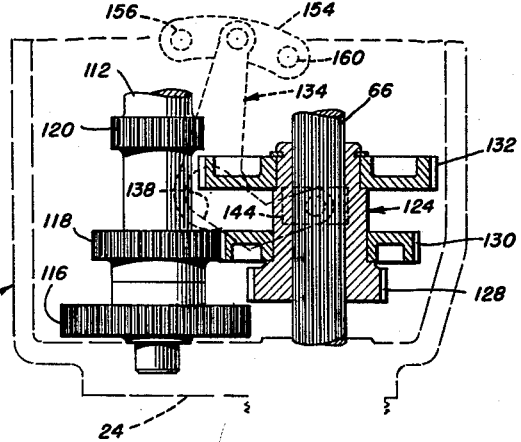
FIG. 7
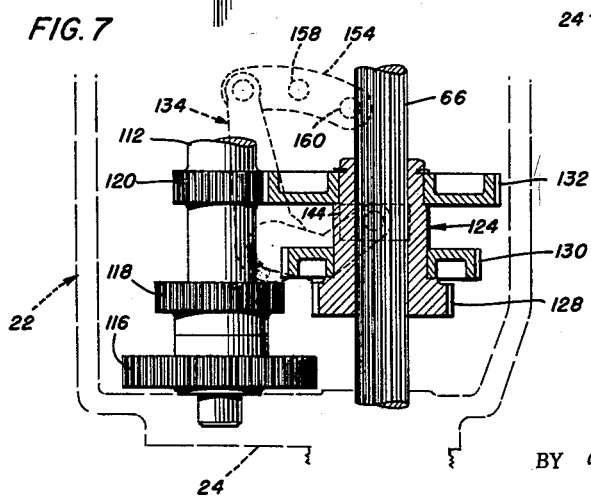
INVENTOR
Walter H. Schnacke
BY 
ATTORNEY April 6, 1965     W. H. SCHNACKE     3,176,547
VARIABLE SPEED TRANSMISSION FOR A PORTABLE DRILL
Filed Feb. 13, 1961     3 Sheets-Sheet 2
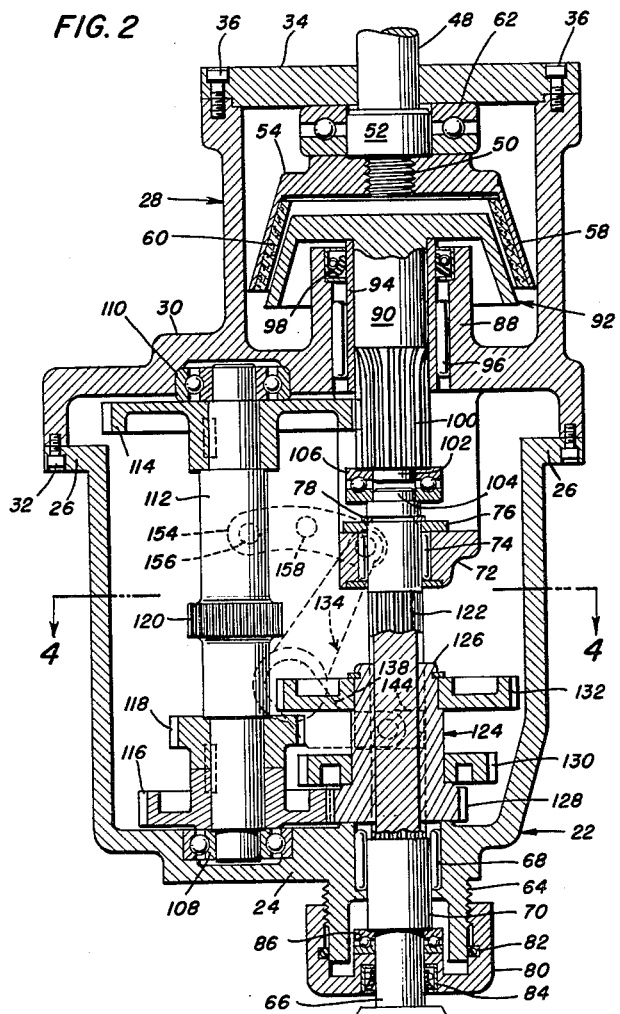
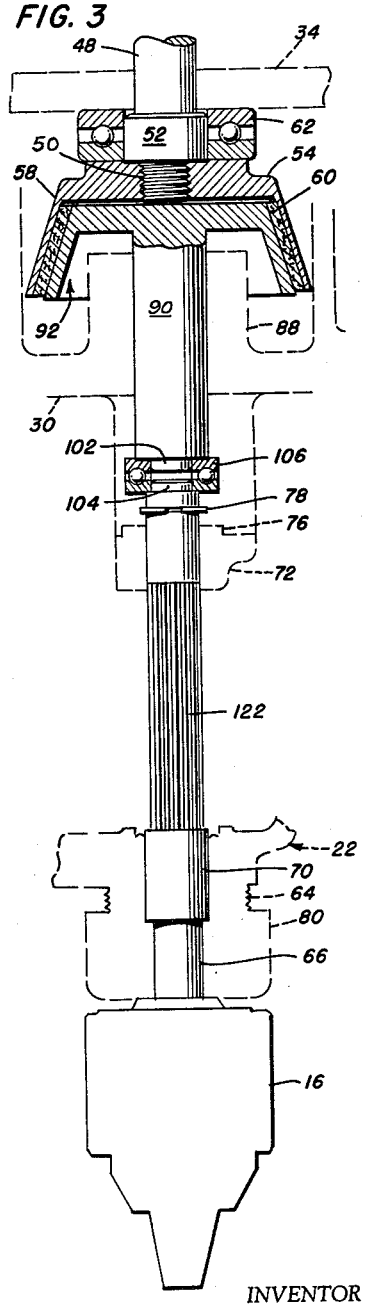
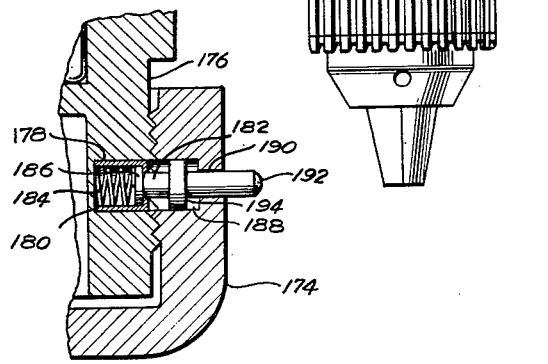
INVENTOR
Walter H. Schnacke
BY
ATTORNEY April 6, 1965 W. H. SCHNACKE 3,176,547
VARIABLE SPEED TRANSMISSION FOR A PORTABLE DRILL
Filed Feb. 13, 1961 3 Sheets-Sheet 3
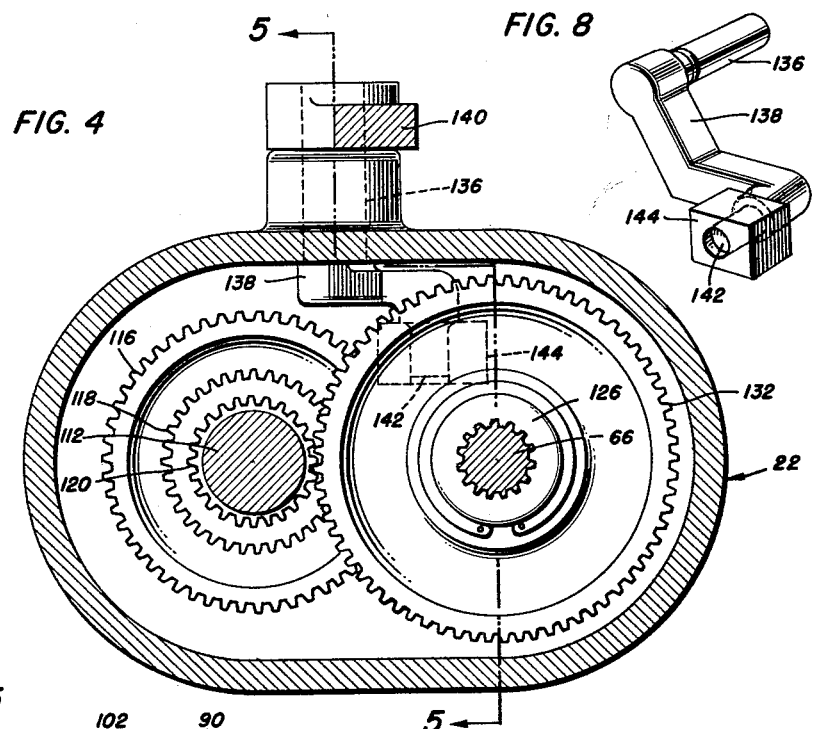
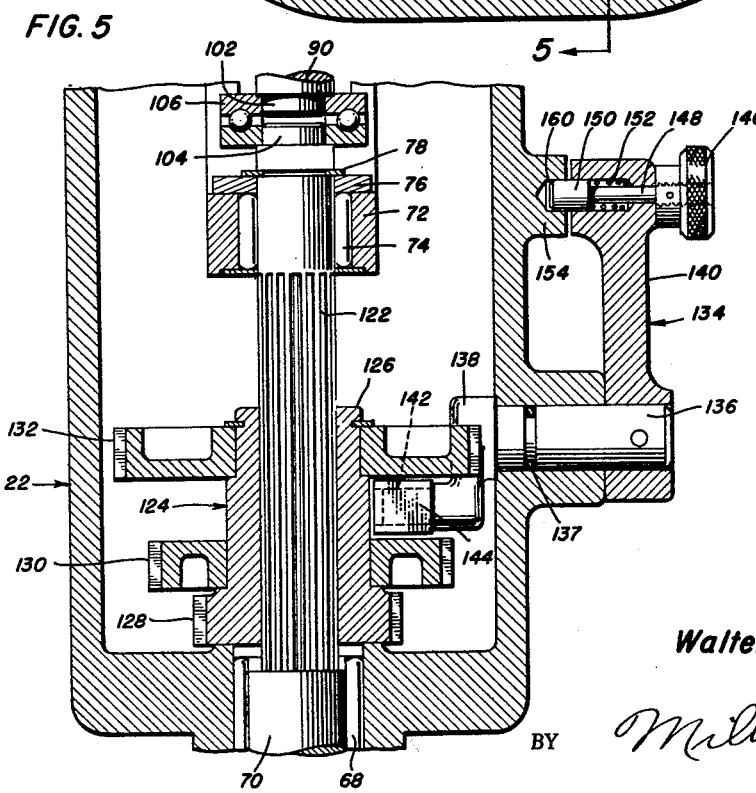
INVENTOR
Walter H. Schnacke
BY
ATTORNEY United States Patent Office 3,176,547
Patented Apr. 6, 1965

3,176,547
VARIABLE SPEED TRANSMISSION FOR A
PORTABLE DRILL
Walter H. Schnacke, 1016 E. Columbia St.,
Evansville 7, Ind.
Filed Feb. 13, 1961, Ser. No. 89,004
9 Claims. (Cl. 77—7)

This invention relates in general to new and useful improvements in portable power tools, and more particularly to a novel portable drill.

There are many instances, particularly in construction work where it is desirable to use a drill, but improper or no power source is available. Accordingly, it is a primary object of this invention to provide a fully portable drill which is driven by an internal combustion engine.

Another object of this invention is to provide a novel portable drill which is driven by an internal combustion engine, the entire drill being light in weight whereby it may readily be handled and held in position for drilling with a minimum of effort.

Still another object of the invention is to provide a novel internal combustion engine driven portable drill which may be operated by one man, the drill having a clutch to permit the engine to constantly run while the chuck of the drill remains stationary, the clutch being engaged by endwise pressure on the chuck to be automatically engaged, and the drill being further provided with a manually setable clutch engaging member for holding the clutch in an engaged position.

In the driving of portable drills, a suitable power source has been a problem. It is now proposed to utilize an internal combustion engine as a power source. However, in order to obtain the maximum power output from a small light weight engine, it is necessary that the engine run at a relatively high speed. While the high speed is permissible to an extent for small drills, particularly when there is a speed reduction, the speed requirements for all sizes of drills are not the same. It is therefore a further object of the invention to provide a simple transmission in a portable drill, which transmission is readily shifted to obtain the desired drill speed.

The use of an internal combustion engine as a power source for a portable drill also presents another problem in that contrary to the use of other portable equipment driven by internal combustion engines wherein the engines are always disposed in the same general plane, drills are used at all angles. This presents a problem of fuel supply and the prevention of fuel leakage. It is therefore a still further object of this invention to provide a novel fuel system for internal combustion engines of the type having pressurized crankcases wherein the fuel tank is sealed and is pressurized by a line leading to the engine crankcase.

With the above, and other objects in view that will hereinafter appear, the nature of the invention will be more clearly understood by reference to the following detailed description, the appended claims and the several views illustrated in the accompanying drawings.

In the drawings:

FIGURE 1 is a perspective view showing the portable drill of this invention in use.

FIGURE 2 is an enlarged longitudinal sectional view taken through the drill with the engine omitted and showing the general details of the clutch and the transmission.

FIGURE 3 is a fragmentary view on a large scale showing the details of the drill when the clutch is engaged.

FIGURE 4 is an enlarged transverse sectional view taken along the line 4—4 of FIGURE 2 and shows the general details of the transmission.

FIGURE 5 is an enlarged fragmentary vertical sectional view taken along the line 5—5 of FIGURE 4 and shows further the details of the transmission.

FIGURE 6 is a fragmentary schematic view showing the transmission in an intermediate gear position.

FIGURE 7 is a view similar to FIGURE 6 and shows the transmission in a low gear position.

FIGURE 8 is an enlarged perspective view of the shift arm of the transmission.

FIGURE 9 is a schematic view showing the pressurized fuel system.

FIGURE 10 is an enlarged fragmentary vertical sectional view showing the details of a latch for securing an adjustable cap to a housing.

Reference is now made to the drawings in detail wherein the complete portable drill, which is the subject of this invention, is shown in FIGURE 1. The drill is generally referred to by the numeral 10 and includes an internal combustion engine 12 and a casing 14. A chuck 16 extends below the casing 14 and carries a drill 18 which is illustrated as being engaged with a work piece 20.

The casing 14, as shown in FIGURE 2, is of a two-part construction and includes a large lower casing half 22 having a bottom wall 24. The casing half 22 is open at its upper end and has an upper flange 26. The casing 14 also includes a smaller upper casing half 28 having an enlarged base wall 30 and an open upper end. The base wall 30 is secured to the flange 26 by a plurality of circumferentially spaced fasteners 32, and a cover plate 34 is secured to the upper end of the casing half 28 by spaced fasteners 36.

The engine 12 is of the conventional two cycle type and is disposed in a horizontal position. As is generally shown in FIGURES 1 and 9, the engine 12 includes a crankcase 38 carrying a cylinder 40. A crankshaft 42 is mounted within the crankcase 38 and is connected to a piston 44 in the cylinder 40 by a connecting rod 46. The crankcase 38 rests upon the cover plate 34 and is secured thereto by suitable fasteners (not shown).

An end portion of the crankshaft 42 extends through the cover plate 34 (FIG. 2), and this end portion may be referred to as a power shaft 48. The power shaft 48 has a reduced threaded portion 50 onto which a sleeve 52 is threaded. An adapter 54 of an upper clutch half 56 is threaded on the power shaft 48 below the sleeve 52. A generally cup shaped member 58 is secured to the underside of the adapter 54, and the member 58 carries an internal frusto-conical lining 60. An end thrust bearing 62 is carried by the sleeve 52 between the adapter 54 and the cover plate 34.

The casing half 22 has a tubular portion 64 extending downwardly from the bottom wall 24. A drill or driven shaft 66 extends down out of the tubular portion 64 and carries the chuck 16. A needle bearing 68 is carried by the bottom wall 24 and is engaged by an enlargement 70 on the drill shaft 66. The casing half 22 has a support flange 72 in the central portion thereof carrying a needle bearing 74 receiving an upper portion of the drill shaft 66. A thrust washer 76 is carried by the drill shaft 66 in engagement with the top of the support flange 72, the thrust washer 76 being held on the drill shaft 66 by a retaining ring 78.

A cap 80 is adjustably threaded on the tubular portion 64 and is sealed relative thereto by a sealing ring 82. A shaft seal 84 is recessed in the lower end of the cap 80 and engages the drill shaft 66. An end thrust bearing 86 is carried by the drill shaft 66 between the end of the cap 80 and the enlargement 70 for a reason to be described hereinafter.

The base wall 30 of the upper casing half 28 has an upwardly directed tubular portion 88 through which an extension shaft 90 extends. A second clutch half 92 is secured to the upper end of the extension shaft 90 in nested relation to the lining 60, but normally spaced therefrom, and the clutch half 92 is engaged with the lining 60 by endwise movement of the shaft 90. A sleeve 94 is carried by the upper part of the extension shaft 90, and the lower portion of the sleeve 94 is engaged with a needle bearing 96 carried by the tubular portion 88 while the upper portion of the sleeve 94 is engaged by a seal 98 carried by the upper part of the tubular portion 88.

The lower portion of the extension shaft 90 is in the form of a pinion 100. The shaft 90 has a reduced lower end 102 which is opposed to a reduced upper end 104 of the drill shaft 66. An end thrust bearing 106 is engaged with the reduced ends 102 and 104 whereby endwise movement of the drill shaft 66 may be imparted to the shaft 90 while permitting relative rotation between the shafts 66 and 90.

A bearing 108 is carried by the bottom wall 24 in alignment with a bearing 110 carried by the base wall 30. A countershaft 112 has the opposite ends thereof journalled in and supported by the bearings 108 and 110 with the countershaft 112 being disposed parallel to the drill shaft 66. A large gear 114 is secured to the upper part of the countershaft 112 and meshed with the pinion 100 to drive the countershaft at a reduced speed from the extension shaft 90.

The countershaft 112 and the drill shaft 66 are parts of a transmission which has three gear ratios. The countershaft 112 carries a lower large gear 116 and a smaller gear 118 is spaced slightly above the gear 116. A still smaller gear 120 is carried by the countershaft 112 and spaced from the gear 118.

The drill shaft 66 has an elongated splined portion 122 on which a cluster gear 124 is splined for sliding movement. The cluster gear 124 includes a sleeve 126 which has a small gear 128 secured to the lower end thereof for meshing with the large gear 116 to provide a high speed drive ratio. A larger gear 130 is secured to the sleeve 126 adjacent the gear 116 for meshing with the gear 118 to provide an intermediate speed drive ratio. A still larger gear 132 is secured to the sleeve 126 in spaced relation from the gear 130 for meshing with the gear 120 to provide a low speed drive ratio.

In order to obtain the various speed drive ratios, the cluster gear 124 is shifted on the drill shaft 66. This is accomplished by a shift mechanism (FIG. 5), generally referred to by the numeral 134. The shift mechanism 134 includes a pivot pin 136 which extends through a boss in the lower casing half 22 and is journalled therein. The pivot pin 136 is sealed to the casing half 22 by a sealing ring 137 engaging the boss. A lever arm 138 is secured to the inner end of the pivot pin 136 while a shift lever 140 is removably secured to the outer end of the pivot pin 136. The lever arm 138 has an offset end portion in the form of a pin 142 on which a shift block 144 is pivoted. The shift block 144 is formed of a suitable anti-friction material and is seated between the gears 130 and 132 to longitudinally shift the cluster gear 124 when the shift mechanism 134 is pivoted.

As is best shown in FIGURE 5, the shift lever 140 is provided with a handle 146 carried by a pin 148 extending through the shift lever 140. The end of the pin 148 remote from the handle 146 is provided with an enlargement 150 against which a spring 152 mounted in the shift lever 140 bears. The outer surface of the casing half 22 is provided with a projection 154 having three bores 156, 158, 160 therein corresponding to the three positions of the shift lever 140 and intended to receive the enlargement 150 to retain the shift mechanism 134 in an adjusted position.

At this time it is pointed out that the lower casing half 22 may be considered to be a transmission housing, and the upper casing half 28 may be considered to be a clutch housing.

The second clutch half 92 is normally spaced from the lining 60, in which position the shafts 66, 90 and 112 are stationary while the power shaft 48 is rotating. When pressure is applied on the chuck 16, the drill shaft 66 is moved longitudinally to move the extension shaft 90 and automatically engages the clutch, as is shown in FIGURE 3. As soon as the pressure is removed from the chuck 16, the clutch is released. When it is not desired to engage the clutch automatically, the drill shaft 66 is maintained in a shifted position by screwing the cap 80 up onto the tubular portion 64 with the thrust bearing 86 shifting the shaft 66 and holding the clutch in an engaged position.

Reference is again made to FIGURES 1 and 9 where it is shown that the engine 12 has a fuel tank 162 which is horizontally disposed when the drill 10 is vertically disposed. In this position of the drill 10, there is no problem of escape of fuel through the filler cap 164 of the fuel tank. However, when the drill 10 is fitted, for example to a horizontal position, fuel would leak if the filler cap 164 were of the usual vented type. Therefore, the filler cap 164 forms a seal with the fuel tank 162 and the fuel tank is pressurized. The pressurizing of the fuel tank 162 is accomplished by a pressure line 166 having one end connected to the crankcase 38 and opening into the interior thereof, and the other end extending up through the bottom of the fuel tank 162 and terminating adjacent the top thereof. A check valve 168 is located in the pressure line 166 to limit flow therethrough to flow from the crankcase 38 to the fuel tank 162. The engine 12 being of the type wherein the crankcase 38 is pressurized during each instroke of the piston 44, pressure is maintained in the fuel tank 162. Thus, the drill 10 may be used in any desired position.

The drill 10 is held in an operating position by a pair of oppositely projecting handles 170, 172 carried by the upper casing half 28. The handles 170, 172 may vary in shape, but are illustrated with the handle 170 being straight and the handle 172 being T-shaped.

Reference is now made to FIGURE 10 wherein there is illustrated a modified cap 174 threaded onto a modified lower tubular portion 176 of the casing half 22. The tubular portion 176 has an outwardly opening bore 178 in which there is seated a cage 180. The cage 180 carries a locking pin 182 which is urged outwardly by a spring 184 which bears against a head 186 of the pin 182, the head 186 engaging the cage 180 and limiting the outward movement of the pin 182.

The cap 174 has a bore 188 which opens inwardly and receives the projecting portion of the pin 182 to permit the pin 182 to prevent rotation of the cap 174 relative to the tubular portion 176. The bore 188 terminates at its outer end in a reduced bore 190 opening outwardly through the cap 174. A manually operable pin 192 extends through the bore 190 and has one end externally of the cap 174 and the other end terminates in the bore 188 in an enlarged head 194. When it is desired to adjust the cap 174 through the rotation thereof, the pin 192 is moved inwardly with the head 194 thereof pushing the pin 182 inwardly against the resistance of the spring 184. When the pin 182 is retracted the cap 174 may be adjusted. The bore 188 being large as compared to the pin 182, the cap 174 may be rotated several times in either direction from the illustrated central position and still be locked by the pin 182.

From the foregoing, it will be apparent that there has been disclosed a novel drill construction for carrying out the intended purpose. Although only a preferred form of the invention has been disclosed, it is not intended to so limit the invention in that minor modifications may be resorted to without departing from the spirit and scope of the invention, as defined in the appended claims.

What is claimed as new:

1. In a portable, hand-manipulable drill, a variable speed transmission comprising a housing, a power shaft extending into said housing, a driven shaft journaled in said housing for supplying power to a drill bit, a countershaft in said housing, means drivingly connecting said countershaft to said power shaft, a first set of gears on said countershaft, a second set of gears on said driven shaft, one of said sets of gears being displaceably mounted on its respective shaft and movable thereon as a unit, a shift mechanism on said housing operatively connected to said one set of gears for shifting and positioning said one set of gears with respect to the other set of gears, said power shaft having an axial extension connected to said transmission, and a clutch connecting said power shaft to said extension.

2. The structure of claim 1 wherein said power shaft, said clutch, said extension and said driven shaft are all in alignment with said driven shaft reacting longitudinally against said extension with said clutch being engaged and released by longitudinal movement of said extension through the movement of said driven shaft.

3. The structure of claim 1 in which said extension includes an intermediate, longitudinally circumferential spline drivingly connected to said countershaft, said driven shaft including an intermediate, circumferential, longitudinal spline upon which said second set of gears is displaceably mounted.

4. The structure of claim 3, wherein said shift mechanism includes a pivot pin journaled in said housing generally transversely of said driven shaft and countershaft, a lever arm secured to said pivot pin within said housing, a friction resistant shift block pivotally carried by said lever arm and disposed between two spaced gears of said one set of gears, and a shift lever secured to said pivot pin externally of said housing.

5. The structure of claim 2 wherein a thrust bearing is disposed intermediate said driven shaft and said extension to provide for end thrust between said driven shaft and said extension while permitting relative rotation therebetween.

6. The structure of claim 2 wherein said clutch includes a pair of nested tapered cup shaped members one of which has a friction type lining.

7. The structure of claim 2 wherein said driven shaft has a thrust collar secured thereto, and said housing includes an adjustable shoulder bearing against said thrust collar for retaining said driven shaft in a clutch engaging position.

8. The structure of claim 7 in which said adjustable shoulder and housing include releasable orienting means thereon for alternatively retaining said adjustable shoulder in positive clutch-engaged or clutch-disengaged positions.

9. In a transmission for use in a portable, hand-manipulable drill, a housing, a power shaft extending into said housing, a driven shaft journaled on said housing, said power shaft having an axial extension aligned with said driven shaft, a thrust bearing in said housing disposed intermediate said driven shaft and said extension effecting axial movement of said extension in response to axial movement of said driven shaft, and a clutch disposed intermediate said extension and said power shaft, said clutch including a pair of circumferentially disposed nested and longitudinally tapered cup-shaped members, one of said cup-shaped members having a friction type lining engageable with said other cup-shaped member.

References Cited by the Examiner

UNITED STATES PATENTS

| | | | |
|---|---|---|---|
| 1,475,153 | 11/23 | Athenas | 74—342 |
| 2,472,999 | 6/49 | Alexander et al. | 175—182 |
| 2,486,254 | 10/49 | Briskin et al. | 77—6 |
| 2,684,834 | 7/54 | Miller | 175—53 |
| 2,771,868 | 11/56 | Knuth | 123—136 |
| 2,794,431 | 6/57 | Ginnow | 123—136 |
| 2,899,850 | 8/59 | Selby et al. | 77—7 |
| 2,911,841 | 11/59 | Miller | 74—342 |
| 2,919,609 | 1/60 | Klingbeil | 77—7 |
| 2,935,057 | 5/60 | Perlewitz | 123—73 |

FOREIGN PATENTS 576,160  5/24  France.

WILLIAM W. DYER, Jr., *Primary Examiner.*

JOHN C. CHRISTIE, FRANK H. BRONAUGH,
*Examiners.*